(12) United States Patent
Mercier

(10) Patent No.: US 7,144,529 B1
(45) Date of Patent: Dec. 5, 2006

(54) METHOD FOR MOLDING OPHTHALMIC LENSES

(75) Inventor: Jean-Louis Mercier, Vincennes (FR)

(73) Assignee: Essilor International (FR)

( * ) Notice: Subject to any disclaimer, the term of this patent is extended or adjusted under 35 U.S.C. 154(b) by 304 days.

(21) Appl. No.: 10/009,180

(22) PCT Filed: Jun. 20, 2000

(86) PCT No.: PCT/FR00/01695

§ 371 (c)(1),
(2), (4) Date: May 9, 2002

(87) PCT Pub. No.: WO00/78531

PCT Pub. Date: Dec. 28, 2000

(30) Foreign Application Priority Data

Jun. 22, 1999  (FR) ................... 99 07936

(51) Int. Cl.
*B29D 11/00* (2006.01)

(52) U.S. Cl. ............... 264/1.38; 264/2.5; 264/2.7; 425/808

(58) Field of Classification Search ............ 264/1.36, 264/1.38, 1.1, 2.5, 2.7; 425/808
See application file for complete search history.

(56) References Cited

U.S. PATENT DOCUMENTS

| 3,278,285 | A | * | 10/1966 | Pickering ............ 65/68 |
| 3,459,085 | A | * | 8/1969 | Takubo ............ 83/410 |
| 3,881,683 | A | | 5/1975 | Whitney |
| 3,940,304 | A | * | 2/1976 | Schuler ............ 156/245 |
| 4,693,446 | A | | 9/1987 | Orlosky |
| 4,919,850 | A | | 4/1990 | Blum |

FOREIGN PATENT DOCUMENTS

| EP | 0 371 621 | | 6/1990 |
| FR | 1128971 | | 1/1957 |
| JP | 64-042222 | | 2/1989 |
| JP | 7-227882 | * | 8/1995 |
| WO | WO89/11966 | | 12/1989 |
| WO | WO98/36868 | | 8/1998 |

* cited by examiner

*Primary Examiner*—Mathieu D. Vargot
(74) *Attorney, Agent, or Firm*—Fish & Richardson P.C.

(57) ABSTRACT

The invention concerns a method for moulding a lens, between a first mould (2) and a second mould (6) which consists in: machining at least one of the moulds (2) into the shape of the lens to be obtained, before moulding. The invention enables to obtain finer lenses, while limiting the required amount of hardenable material for making the lens.

22 Claims, 2 Drawing Sheets

FIG_1
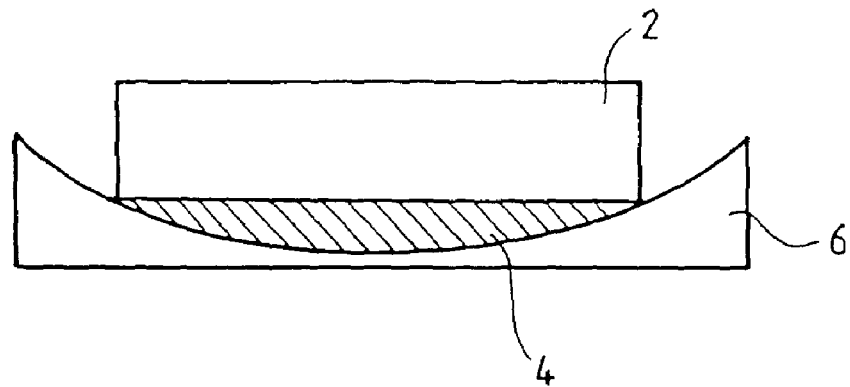
FIG_2
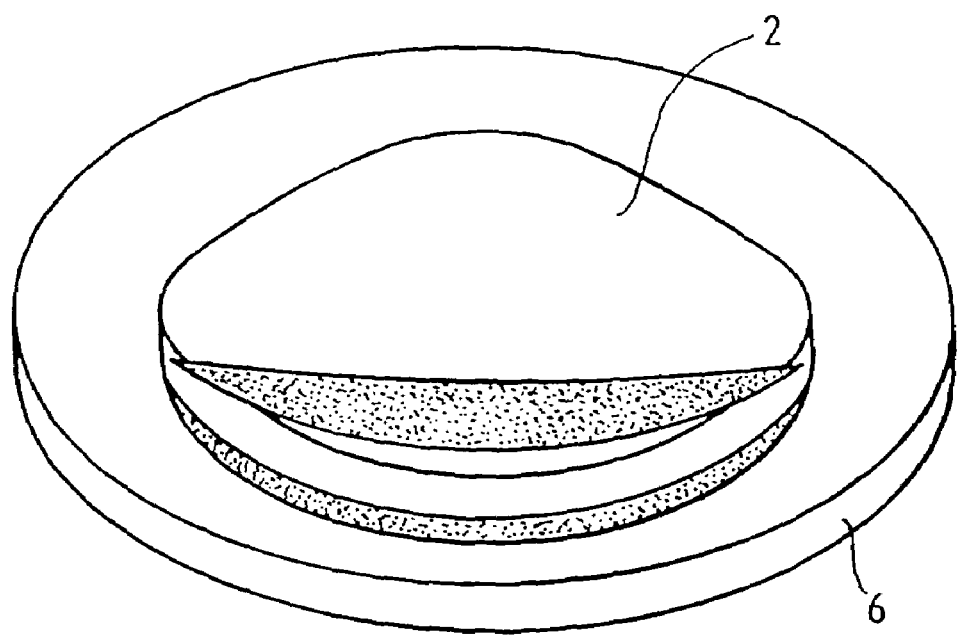

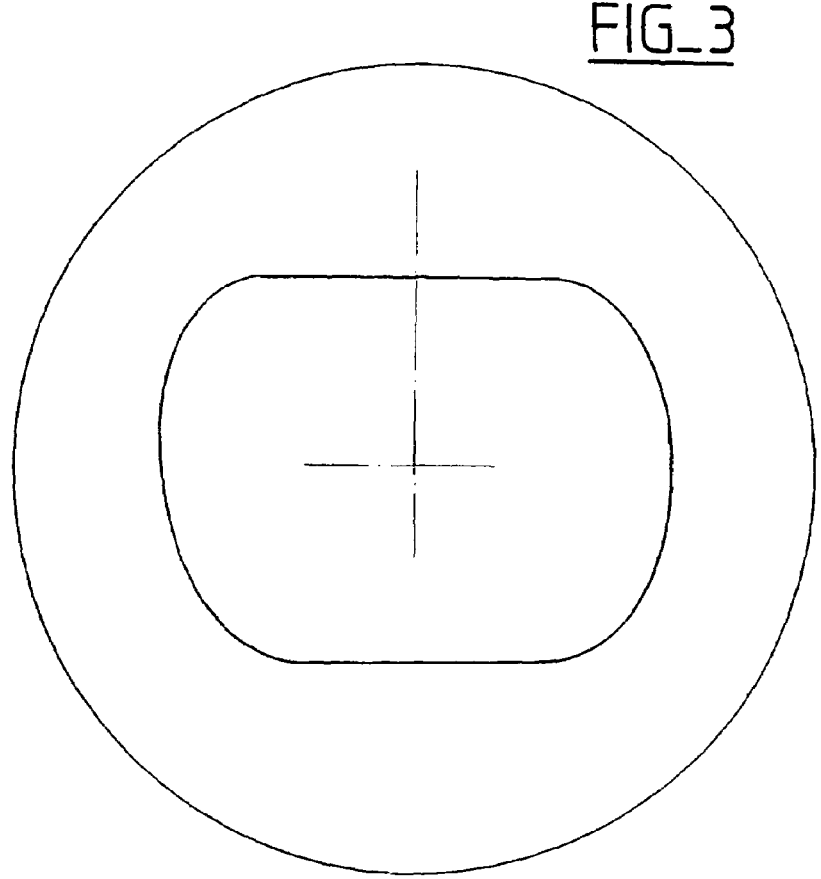
FIG_3
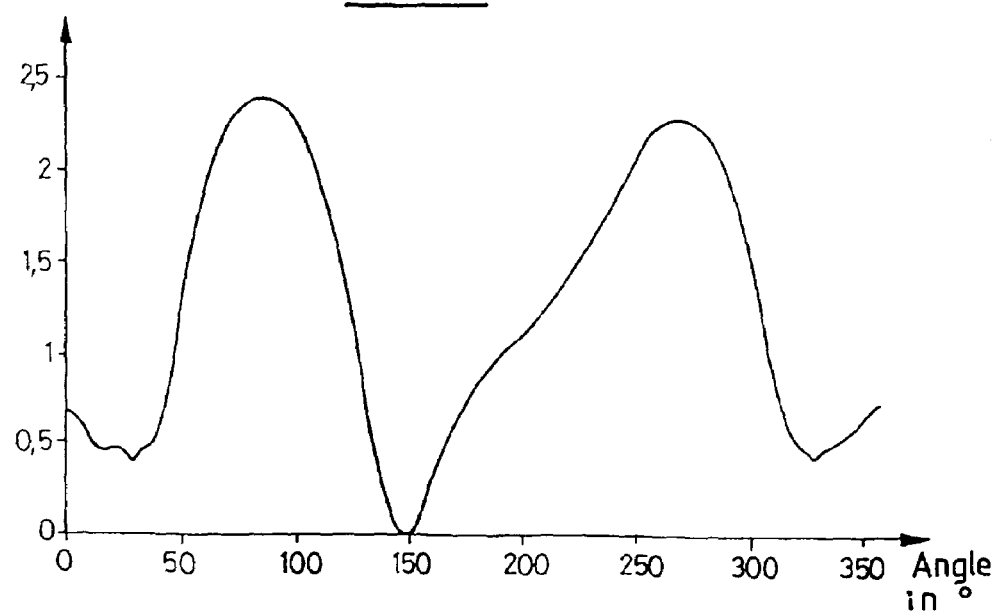
FIG_4

METHOD FOR MOLDING OPHTHALMIC LENSES

The invention relates to molded lenses, and more specifically to a method for molding ophthalmic lenses.

Ophthalmic lenses made of organic glass—polymerized material—are used for optical correction; they are mounted for this purpose in frames. One of the problems which arises for such lenses is that of their manufacture.

CA-A-0 596 660 discloses a method and an apparatus for molding lenses made of setting resin. Said document proposes to mold the lenses between two tempered glass molds with parallel faces; the molds are circular, and are separated at their periphery by a flexible or rigid ring seal whose thickness corresponds to the final thickness of the lens. The assembly allows the lenses to be molded without the resin coming into contact with the air when it is heated. Said document mentions the problems of shrinkage of the resin when it is heated, and of isolation of the ambient air for the polymerization. FR-A-1 128 971 proposes the use of quartz molds for the molding.

FR-A-1 166 582 discloses a method and apparatus for molding lenses; the apparatus has a lower punch, made of glass and/or metal, and an upper punch; said document suggests that the lower punch should extend beyond the edge of the upper punch, so as to make a reserve for an excess of monomer to be polymerized. As the document proposes heating the monomer starting from the center of the punch, the presence of excess resin makes it possible to compensate for the shrinkage in the region of the molding surfaces of the punches. Said document also mentions that the rim of the lens is rough due to the provision of the reserve, and must then be polished.

U.S. Pat. No. 5,288,221 proposes a solution to another problem. The subject of said document is that of solving the problems arising in the manufacture of ophthalmic lenses by bonding two wafers to each other. This bonding is an operation which is difficult to perform especially on account of the impurities and bubbles in the adhesive; in addition, it is necessary in such a solution to have available a large number of wafers. Said document thus proposes to mold a lens to one of the wafers: during the polymerization, the polymerizable material assembles with the wafer to make the lens. To carry out the molding, said US document proposes to use a ring seal, arranged around the wafer. A support positions the mold at a known distance from the wafer, so as to be able to cure the polymerizable material. It is also suggested in said document that the mold should be slightly smaller than the wafer: this makes it possible to fill the cavity to excess to avoid bubbles, and that the excess material should escape between the periphery of the mold and the ring seal. EP-A-0 371 621 describes another method for manufacturing lenses by bonding two wafers. Said document proposes to mold a support onto the front of one wafer, to enable the subsequent manipulation and machining of the wafer. The support is detached from the wafer after it has been machined and bonded to the second wafer.

WO-A-89/11966 raises the problem of machining the surfaces of ophthalmic lenses. Said document proposes to provide plastic half-molds, avoiding any subsequent machining of the surface of the lenses; the half-molds are used to mold lenses; it is merely necessary to machine these lenses to the shape of the frame, without machining the surface. The problem raised in said document is that of surface machining, but trimming is not at all mentioned, or even suggested.

The prior art thus describes the problems associated with molding a viscous polymerizable material, which shrinks during the polymerization.

U.S. Pat. No. 3,881,683 discloses a method for molding ophthalmic lenses. Said document attempts to solve the problem of the thickness of the edges of lenses of negative power. It proposes a ring seal with seats designed to receive half-molds; the presence of these seats reduces the risks of breakage of half-molds made of glass. Said document also proposes to adapt the shape of the seal to reduce the thickness of the edge of the lenses. In all cases, a step of machining the lens to adapt it to the shape of the frame is necessary; the document indicates that the method is carried out without losses on the final diameter of the lens. A circular lens is thus obtained, which still needs to be adapted to the shape of the frame. Said document is directed exclusively toward the problem of lenses of negative power, and makes no mention either of other lenses or of the problem of the shape of the lenses.

The invention addresses the new problem of the product obtained during molding. It is based on the observation that the ophthalmic lenses supplied to opticians require various operations in order to be adapted to the shape of the frame chosen by the wearer—whether this is a standard encircling frame or a more modern frame which does not go all the way around the lens. The lens intended to be mounted in the frame may be obtained either by machining and trimming a semi-finished glass, or by trimming a finished glass. In the first case, the operation for surfacing the rear face is expensive; in the second case, the lens obtained is not optimized in terms of thickness.

In addition, the polymerizable material is expensive: a large amount of the material used during the molding is wasted, insofar as it is then discarded during the trimming, and possibly the surfacing.

Finally, the standard methods pose a problem, more particularly for the manufacture of convex lenses, for which the thickness of the lens is larger at the center of the lens than at its periphery. Finished lenses are manufactured in the prior-art methodes by fixing the thickness of the lens at its periphery, for example at a value of 1 mm as proposed in U.S. Pat. No. 5,288,221. After trimming, especially for lenses with a strong correction, the thickness of the lens at its periphery is large. The lenses obtained have the drawback of being thicker than necessary, and thus heavier and more unattractive.

The invention makes it possible to improve the appearance of a molded lens adapted to the shape of the frame, especially for strong corrections; it provides a lens which, for an equal power, is thinner than lenses adapted to the shape of the frame by trimming finished glasses. It ensures that the lens is of lower weight, and thus improves the comfort for wearers. The invention proposes a method which is less expensive than the one conventionally used for manufacturing such lenses from semifinished products. It saves on polymerizable material and makes the manufacture by molding easier. It makes it possible to dispense with the machining step, and to obtain a lens whose thickness is optimized relative to the shape of the frame, and relative to the wearer's prescription.

To solve these new problems and to obtain these advantages, the invention proposes a method for molding a lens adapted to a wearer's prescription and to the shape of the frame chosen by the wearer, comprising the steps of:

supplying a first mold which is substantially in the shape of the lens to be obtained, or of the frame to be obtained;

supplying a second mold;

molding and curing a setting material between the first mold and a second mold;

removing the lens obtained from the mold.

In one embodiment, the step of supplying a first mold comprises a step of trimming said mold.

In another embodiment, the curing step is a step of partial curing, and the method also comprises a step of total curing of the lens.

In another embodiment, the step of molding and curing comprises a step of assembling the molds followed by a curing step.

Advantageously, the partial curing step lasts less than 3 minutes.

Preferably, the total curing step lasts between 5 and 30 minutes.

In yet another embodiment, the method involves a step of removing mold-positioning devices after the partial curing step and before the total curing step.

Advantageously, the partial curing step comprises an irradiation of the setting material, preferably by irradiation from only one side of the assembly of the first and second molds.

In one embodiment, the total curing step comprises irradiation of the setting material, preferably by irradiation from both sides of the assembly of the first and second molds.

Preferably, the total curing step comprises the heating of the setting material.

Advantageously, the demolding step comprises the application of a thermal shock to the assembly of the first and second molds.

In one embodiment, the method involves a step of supplying a second mold in the shape of the lens to be obtained.

In this case, the step of supplying a second mold may comprise a step of trimming said mold.

Preferably, the lens is an ophthalmic lens.

The invention also proposes a lens obtained according to such a method.

The invention further proposes an untrimmed molded lens of noncircular shape.

Other characteristics and advantages of the invention will emerge on reading the description which follows of the embodiments of the invention, which is given by way of example and with reference to the attached drawings, which show:

FIG. 1 a representation in perspective of an assembly according to the invention;

FIG. 2, representation in cutaway of the assembly of FIG. 1;

FIG. 3 a representation in top view of an assembly according to the invention;

FIG. 4, a graph of the thickness at the edge of a lens according to the invention.

The invention proposes, as in the prior art, to mold a lens made of polymerizable material between two molds; it also proposes to trim, before molding, at least one of the two molds, to give it a shape close to that of the shape of the trimmed lens.

The invention makes it possible in this way to limit the amount of polymerizable material used, and to optimize the thickness of the final lens as a function of the shape of the frame and the wearer's prescription. A saving in polymerizable material of the order of 60% relative to the standard method using a semifinished lens may be achieved.

One preferred embodiment of the invention, in which only the upper mold is trimmed, is described with reference to the figures. FIG. 2 shows a representation in cutaway of an assembly according to the invention; this assembly comprises a first mold 2, which is the upper mold in the example, and a second mold 6 which is the lower mold. Between these molds is cast a setting material 4, for example a setting composition such as those described in patent U.S. Pat. No. 5,702,825 of the Applicant. More generally, setting materials known per se, and for example thermosetting materials, or even thermoplastics, may be used to carry out the invention; in the latter case, the device is preferably adapted; the technique of compression injection-molding may be used in this case. The convex mold, generally made of metal, trimmed to the shape of the frame, may be reused.

As shown in the figure, and as emerges more clearly from FIG. 1, the second mold 6 is a circular mold, of the type commonly used nowadays for molding lenses; it may especially be a glass, metal, ceramic or plastic mold, such as those described in the prior-art documents mentioned above. It has a diameter in the region of 80 mm, close to the diameter of the known lenses of the prior art.

On the other hand, the first mold 2 of FIG. 1 has a contour which is substantially that of the lens to be obtained. "Substantially" the shape of the lens means a shape which allows the optional subsequent trimming of the lens to make it possible, for example, to remove small peripheral molding defects, or alternatively a trimming of the perimeter of the lens to allow it to be mounted in a specific frame. A value of a few millimeters around the inner shape required by the frame is adapted. In all cases, it is only a finishing trimming, on a few millimeters or less; it does not involve a substantial removal of material, like that which is necessary to go from a circular lens with a diameter of between 60 and 80 mm to a lens having the shape of the frame—which may have Boxing sides A and B of 30 to 40 mm. The removal of material is thus at least 1 cm.

The contour may be of any nature, and in fact depends on the nature of the frame chosen by the final user of the lens. The maximum size of the mold between two points on its perimeter is less than the diameter of the second mold. The first mold is advantageously obtained by trimming before molding the setting material, for example, by trimming using a standard grinding wheel for a circular mold; a grinding wheel of the type described in patent U.S. Pat. No. 4,596,091 of the Applicant may advantageously be used.

Any material may be used for the first mold; insofar as the mold is to be used only once, or otherwise only a very limited number of times, it is advantageous that its price should also be limited; one simple solution consists in using a thermoplastic or thermosetting mold such as, for example, a mold made of polycarbonate or poly(allyldiethylene glycol carbonate).

The first and second molds are assembled using apparatus which is known per se for the molding and curing of setting material; from this point of view, the teaching of the prior art may be applied, and, for example, devices for holding in position molds of the type described in the prior-art patents mentioned above may be used. A ring seal may be included around the first mold, if necessary, and especially in the case of concave lenses. If the second mold is not trimmed, it may be used as a reserve of material for the molding.

Contrary to the prior art, the invention makes it possible to obtain a zero or very low thickness on the perimeter of the lens. It is possible, for example, to adjust the position of the molds such that they are in contact at one point on the periphery of the first mold, or such that they are 1 mm or less away from the periphery of the first mold. It is clear that the position of the molds, as in the prior art, depends on the prescription.

The molding may be performed as follows:
  introduction of the second mold;
  where appropriate, insertion of a ring seal;
  introduction of the setting material into the second mold; the amount of maerial may be calculated beforehand;
  introduction of the first mold; this sequence makes it possible to successfully remove the bubbles, better than an injection of the material between the molds; however, an injection remains possible.

The method for curing the material is performed in a manner which is known per se. The method may also be performed in several steps, for example:
  irradiation, for example with ultraviolet rays, to set the setting material;
  this step may be termed as partial curing;
  dismounting from the mold-holding apparatus;
  total curing, for example by heating in an oven; a precise temperature control may be ensured, and the shrinkage may thus be limited, ensuring good curing. The total curing may also be performed by ultraviolet irradiation.

In a typical case, the partial curing may follow the assembly of the molds; it normally lasts less than 3 minutes, which is sufficient to ensure that the assembly formed from the molds does not move. On the other hand, the total curing step may last between 5 and 30 minutes.

It is then possible to ensure removal of the lens from the mold, this lens having the power and shape required for the wearer and his frame, for example by subjecting the assembly containing the lens of the invention to a thermal shock.

FIG. 1 shows a representation in perspective of an assembly according to the invention; as for FIG. 1, the mold-holding apparatus has not been shown. It is clearly seen in the figure that the first mold has a shape that is substantially identical to the shape of a frame, whereas the second mold is larger in size and is designed to serve as a reservoir of material.

FIG. 3 shows a representation in top view of an assembly according to the invention; this is the case of a lens with a power of +6.00 diopters, made of a setting material with an index of 1.5, without off-centering. By disregarding the effect of the thickness of the center of the lens—which is a second-order term in the correction, a first mold having the shape in the figure, with a radius of curvature of 250 mm, is obtained for a second mold with a base of 8 diopters and a radius of 62.5 mm. The maximum size of the first mold is 53.2 mm for the shape of frame chosen.

FIG. 4 shows a graph of the thickness of a lens manufactured using the mold of FIG. 3. The thickness in millimeters is given on the y-axis and the angle is given on the x-axis. The thickness ranges between 0 and 2.4 mm. For comparative purposes, in a standard trimmed lens, the thickness for this prescription and this shape of frame ranges between 3.5 and 5.9 mm.

For the convex mold, which is the trimmed mold in the example of the figures, the base may be varied in steps of 0.12 diopters. For the cylinder, a step of 0.25 diopters would be acceptable. For a power range of 1 diopter and a cylinder range of 1 to 3 diopters, 8×12, i.e. 96 different molds may thus be provided. For the concave mold, there is no change relative to the standard manufacturing method, and the number of molds required to cover the range, in addition and in power, is used.

Needless to say, the present invention is not limited to the examples and embodiments described and shown, but is susceptible to numerous variants accessible to those skilled in the art. A wafer which must form part of the lens may be used for one of the molds, as proposed in U.S. Pat. No. 5,288,221: in this case, the method of the invention also makes it possible to limit the amount of material.

The two molds may also be trimmed before molding.

The invention applies not only to standard prescriptions—spherical or with a torus—but also to the manufacture of gradual or nongradual varifocal lenses. In this case, the second mold is a varifocal aspherical mold.

The invention claimed is:

1. A method for molding a non-circular lens adapted to a wearer's prescription and to the shape of a frame chosen by the wearer, comprising the steps of:
  supplying a non-circular first mold substantially in the shape of the frame chosen by the wearer;
  supplying a second circular mold;
  molding and curing a setting material between the first mold and a second mold, a maximum size of the first mold between two points of its perimeter being less than a diameter of the second mold;
  removing the cured material from the first and second molds to define the lens, and
  securing the lens to the frame, wherein the periphery of the cured material is not trimmed by more than a few millimeters prior to securing the lens to the frame.

2. The method as claimed in claim 1, wherein the step of supplying a first mold comprises a step of trimming said mold.

3. The method as claimed in claim 1, wherein the curing step is a step of partial curing, and wherein the method further comprises a step of total curing of the lens.

4. The method as claimed in claim 1, wherein the step of molding and curing comprises a step of assembling the molds followed by a curing step.

5. The method as claimed in claim 3, wherein the partial curing step lasts less than 3 minutes.

6. The method as claimed in claim 3, wherein the total curing step lasts between 5 and 30 minutes.

7. The method as claimed in claim 4, wherein the step of assembling comprises using mold-positioning devices and wherein the method further comprises a step of removing the mold-positioning devices after the partial curing step and before the total curing step.

8. The method as claimed in claim 3, wherein the partial curing step comprises an irradiation of the setting material from only one side of the assembly of the first and second molds.

9. The method as claimed in claim 3, wherein the total curing step comprises an irradiation of the setting material from both sides of the assembly of the first and second molds.

10. The method as claimed in claim 3, wherein the total curing step comprises heating of the setting material.

11. The method as claimed in claim 1 wherein the removing step comprises applying a thermal shock to the assembly of the first and second molds.

12. The method as claimed in claim 1, wherein the step of supplying a second mold comprises a step of trimming said second mold.

13. The method of claim 1, wherein the lens is an ophthalmic lens.

14. A method for molding a non-circular lens adapted to a wearer's prescription and to the shape of a frame chosen by the wearer, comprising the steps of:
  supplying a non-circular first mold substantially in the shape of the lens to be obtained;
  supplying a second circular mold;
  molding and curing a setting material between the first mold and a second mold, a maximum size of the first mold between two points of its perimeter being less than a diameter of the second mold and the first mold being positioned over the second mold;

removing the cured material lens from the first and second molds to define the lens; and securing the lens to the frame, wherein the periphery of the cured material is not trimmed by more than a few millimeters prior to securing the lens to the frame.

15. The process as claimed in claim 14, wherein the step of molding comprises providing the second mold in a horizontal position.

16. The process as claimed in claim 15, wherein the step of molding comprises:

positioning the second mold and positioning the first mold.

17. The process as claimed in claim 16, wherein the step of molding comprises, after positioning the second mold, introducing the setting material in the second mold.

18. The process as claimed in claim 16, wherein the step of molding comprises, after positioning the first mold, injecting the setting material between the molds.

19. The process as claimed in claim 16, wherein the step of molding comprises, after positioning the second mold, positioning a ring seal.

20. The process as claimed in claim 14, further comprising the step of providing a ring seal around the first mold.

21. The process as claimed in claim 1, wherein the second mold is positioned 1 mm or less away from a periphery of the first mold when molding and curing the setting material.

22. The process as claimed in claim 14, wherein the second mold is positioned 1 mm or less away from a periphery of the first mold when molding and curing the setting material.

* * * * *